April 9, 1957 E. H. GRONLUND 2,788,146
BOAT TRAILER
Filed March 5, 1956 2 Sheets-Sheet 1
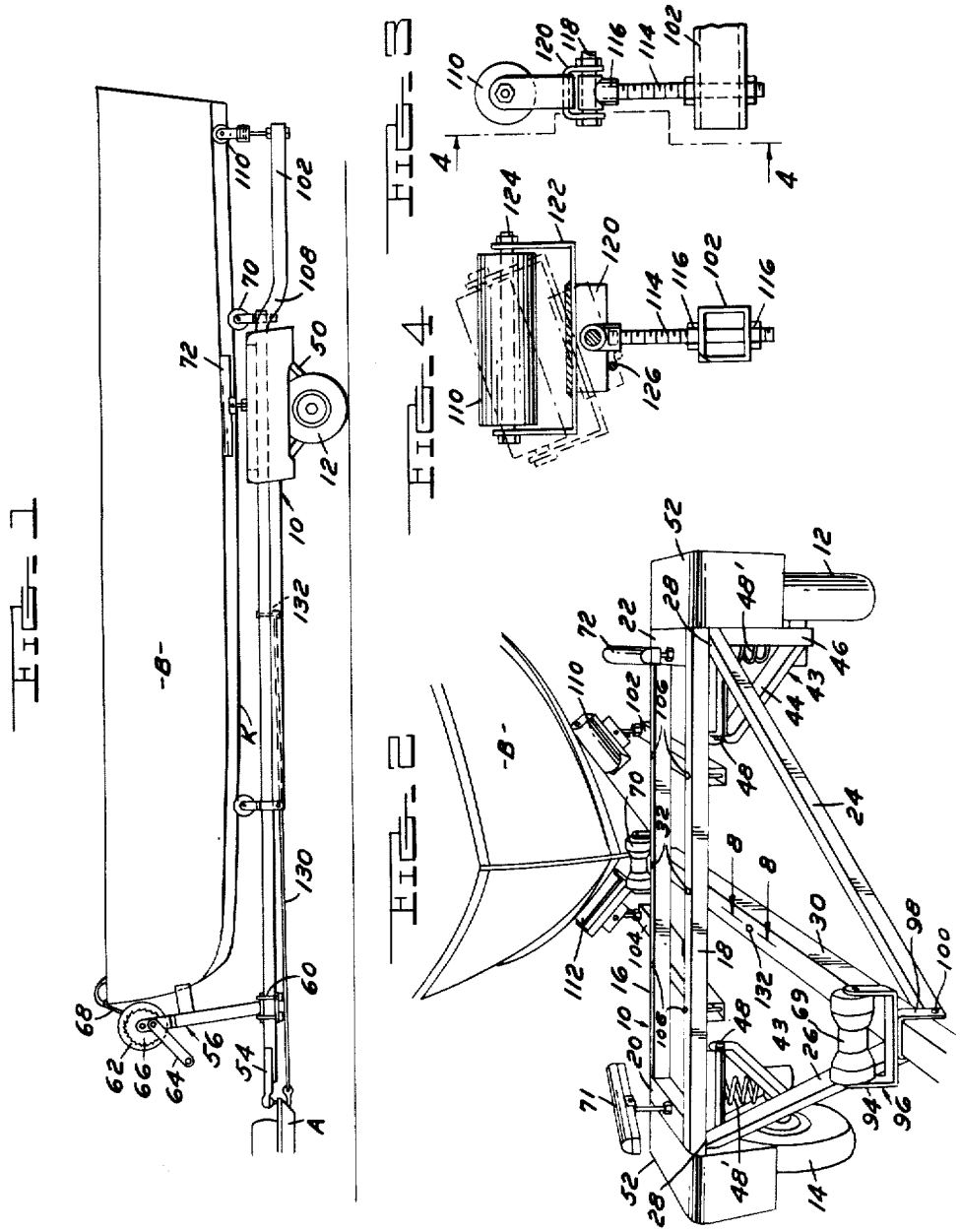
INVENTOR.
ERNST H. GRONLUND
BY
Burton & Parker
ATTORNEYS

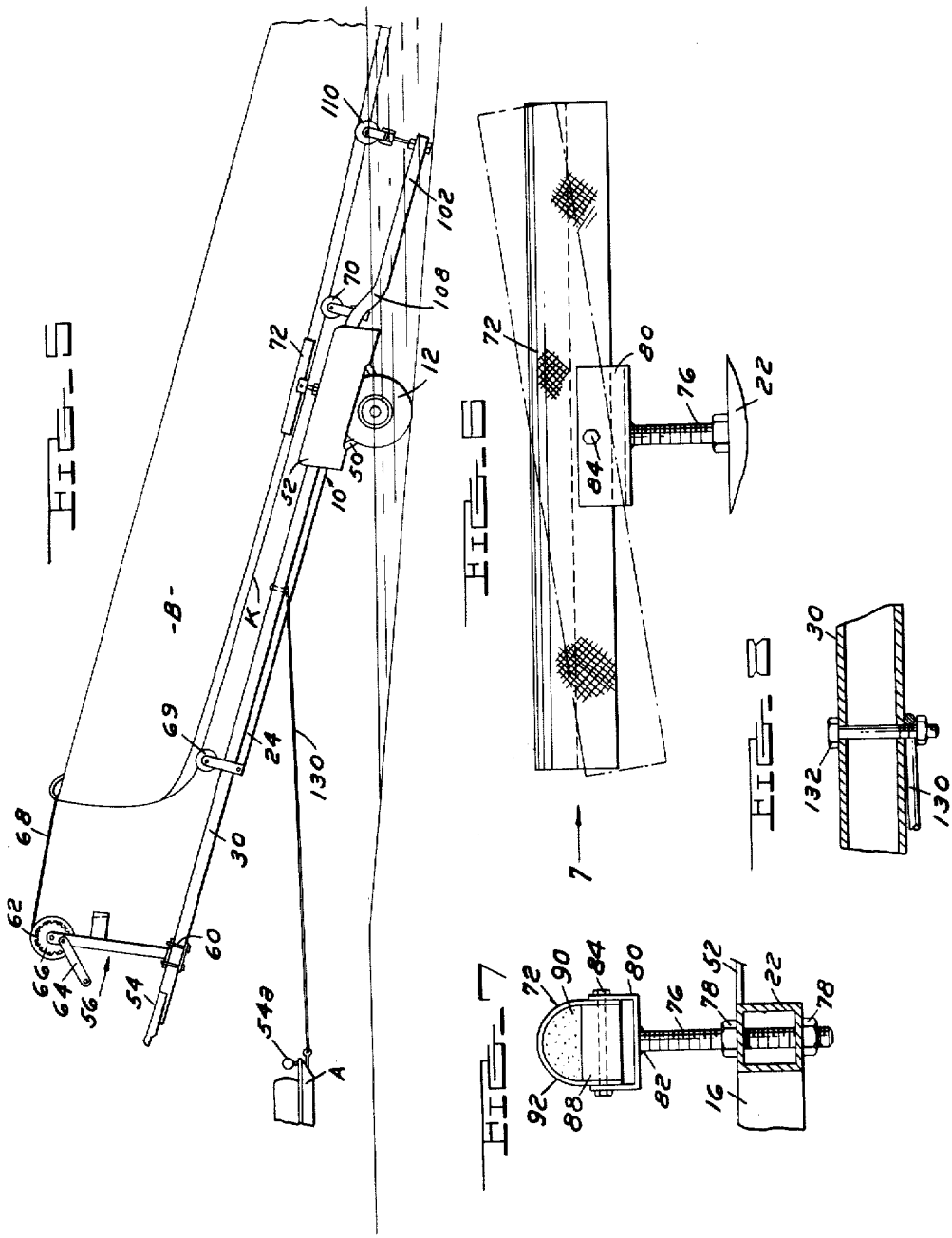

United States Patent Office 2,788,146
Patented Apr. 9, 1957

2,788,146

BOAT TRAILER

Ernst H. Gronlund, Algonac, Mich.

Application March 5, 1956, Serial No. 569,523

5 Claims. (Cl. 214—506)

This invention relates to trailers adapted to be drawn by automotive vehicles and particularly to an improved two-wheeled boat trailer.

An object of the invention is the provision of a trailer which will not only properly support a boat thereupon for transport behind an automotive vehicle, but will also permit ready launching of the boat carried by the trailer at the water's edge or the loading of the boat onto the trailer.

Another object of the invention is the provision of a trailer of the character mentioned which is particularly well suited to the loading or unloading of a boat at the water's edge in that the trailer will hold the boat in proper alignment for loading and unloading and will prevent the boat from sluing around because of wind or waves during those crucial moments when the boat is partially water-borne and partially supported by the trailer.

Another object of the invention is the provision of self-aligning boat supporting and guiding means which will automatically align themselves with the curvature of the hull of a boat both while the boat is resting on the trailer and while it is being moved off or onto the trailer.

Still another object of the invention is the provision of control means which will eliminate the pulling and tugging generally required during the launching or loading of boats by older type trailers.

Other objects, advantages, and meritorious features will more fully appear from the specification, claims, and accompanying drawing, wherein:

Fig. 1 is a side view of a trailer embodying my invention showing a boat loaded thereupon for transport behind an automotive vehicle;

Fig. 2 is a perspective view of a trailer embodying my invention showing a boat disposed in a position to be loaded on the trailer, for example, at the water's edge;

Fig. 3 is a side view of the guiding and supporting rollers at the rear end of the trailer;

Fig. 4 is a cross sectional view taken on the line 4—4 of Fig. 3;

Fig. 5 is a side view of a trailer embodying my invention showing the same tilted to permit the launching of a boat resting thereupon;

Fig. 6 is a side view of one of the bilge blocks;

Fig. 7 is an end view of the bilge block shown in Fig. 6 looking in the direction of arrow 7; and Fig. 8 is a cross sectional view taken on the line 8—8 of Fig. 2.

My invention is shown in a preferred form as embodied in the trailer disclosed in Figs. 1, 2, and 5 of the drawings. As therein shown, a boat trailer includes a wheeled frame generally indicated at 10 and provided with a pair of road wheels 12 and 14, one at each side of the frame. The frame is shown in Fig. 2 as constructed of metal channels and includes a main rectangular frame section having frame members 16 and 18 held in spaced apart relation by shorter frame members 20 and 22 which may be welded to members 16 and 18. Forwardly extending tongue-supporting frame members 24 and 26 may be welded as at 28 to the rectangular section and welded together at their forward and meeting ends beneath a tongue 30 overlying the forward ends of members 24 and 26. The tongue 30 extends along the longitudinal center line of the frame and is bolted to the rectangular frame section as at 32. A bolt, not shown, extends through the tongue and through the members 24 and 26 where they are connected together at their forward ends, to secure the members to the tongue.

The wheels 12 and 14 may be individually suspended from the frame, each by a triangular bracket 43. Each bracket includes channel members 44 and 46 pivotally connected, as by a bolt 48, to the rectangular frame section at the leading edge thereof. The wheel axles are connected in any convenient manner to the lower end of the triangular brackets. Suitable coil springs 48 serve to tension the lower end of the brackets 43 downwardly. Shock absorbers 50, one of which is schematically indicated in Fig. 1, may also be provided. Suitable wheel fenders 52 cover the upper portion of the wheels and are secured in any convenient manner to the frame.

A trailer hitch 54 at the forward end of the tongue serves to couple the trailer to an automotive vehicle, the rear bumper of which is indicated at A in Figs. 1 and 5, with a ball member 54-a, adapted to receive the hitch 54, mounted on the bumper. Also mounted at the forward end of the tongue is a winching device 56 for loading or unloading a boat B onto or off the trailer. Such device may include an upstanding bracket 58 bolted to the tongue as at 60, with a winch 62 mounted at the top of the bracket. A suitable cranking car 64 with gear drive 66 serves as a means for cranking the winch. A hauling cable or rope 68 wound on the winch is attachable at the free end to the bow of the boat and together with the winch serves to ease the boat onto or off the trailer as explained more fully hereinafter.

Means are mounted atop the frame to position and support the boat B thereon. Such means include a pair of keel rollers 69 and 70 disposed along the longitudinal center line of the frame, and a pair of self-aligning bilge blocks or cradling bunks 71 and 72 disposed at opposite sides of the frame. The bilge blocks are shown in detail in Figs. 6 and 7. Each block is pivotally mounted on an upstanding threaded member 76 which extends through the frame members 20 and 22 with nuts 78 threaded on member 76 above and below the frame to adjustably position the blocks upon the frame. A U-shaped bracket 80 is welded as at 82 atop each screw 76 and pivotally supports the bilge block between its upstanding arms on a pin 84. The block includes a solid portion 88 which may be of wood or metal and overlying which is a soft material 90 such as sponge rubber covered by canvas 92 which may be secured in any convenient fashion to the solid portion 88 of the block. The pivotal axes of the bilge blocks extend substantially normal to the longitudinal center line of the frame. Because of the pivotal mounting of the blocks they readily conform to the shape of the hull of the boat either when the boat is merely resting on the trailer or when it is being moved longitudinally. Two different pivotal positions of the blocks are shown in solid and dotted outline in Fig. 6.

The weight of the boat on the frame is primarily taken by rollers 69 and 70, each of which is adapted to support and guide the keel K of the boat. Both rollers are supported in the same manner and therefore a description of the support for the roller 69 will suffice for the roller 70. The keel roller 69 is mounted for rotation in the upper U-shaped half 94 of a roller-supporting bracket generally indicated at 96, with the lower U-shaped half 98 of the bracket received over the tongue. The extremities of the lower half 98 of the roller bracket are clamped against the tongue by a bolt 100 extending below the tongue and through such extremities. The bilge blocks and rollers 69 and 70 to serve to support the boat throughout the major portion of its length.

Means are provided for supporting the stern of the boat, which may be relatively heavy when an outboard motor is left hanging on the transom, and for facilitating the loading and launching of the boat at the water's edge. Such means comprises rearwardly extending arm means at the rear end of which are self-aligning soft rollers disposed on opposite sides of the center line of the frame and which serve to guide the bow of the boat onto the trailer and the keel onto the roller 70 as the boat is loaded from the water, and which, when the boat is launched, serve to support the stern of the boat until the stern is water-borne. Such arm means include a pair of rearwardly extending arms 102 and 104 which are bolted as at 106 to the rectangular frame section against the underside thereof. It will be noted that the arms are bent downwardly as at 108. The reason for this will become apparent hereinafter. Rubber or other soft resilient rollers 110 and 112 are mounted adjacent the rear end of the arms at opposite sides of the center line of the frame. The rollers are shown in detail in Figs. 3 and 4. Each is pivotally supported upon the upper end of a threaded member 114 which extends through the arm members 102 and 104, with nuts 116 threaded on the screw member 114 and overlying and underlying the arms to vertically adjustably position the rollers with respect to the arms. Secured to the upper end of the screw member 114 is a T-shaped support 116, through the head of which freely extends a pin or bolt 118. The pin or bolt 118 extends through an inverted U-shaped member 120, to the bottom of which is secured, as by welding, an upstanding U-shaped member 122. A pin or bolt 124 extending between the upstanding arms of member 122 supports the rollers 110 and 112. A stop member 126 is provided to limit excessive tilting of the roller.

As a boat B moves from the position shown in Fig. 2 to that shown in Fig. 5 during loading of the boat onto the trailer, the rollers 110 and 112 pivot from roughly the position shown in dotted outline in Fig. 4 to the solid outline position. It will be noted that the pivotal axes of the supporting and guiding rollers 110 and 112, defined by the axis of each pin 118, extend substantially parallel to the longitudinal axis of the trailer frame so that the rollers 110 and 112 may pivot to the positions shown in Fig. 2 to conform to the shape of the bilges of the boat.

As will be noted in Fig. 2 the rollers abut the bilges of the boat at opposite sides of the keel and are spaced upwardly from the keel. Such rollers serve to hold the boat in alignment with the longitudinal center line of the trailer. When the hauling line 68 is drawn taut, and with the boat in the Fig. 2 position, the reaction of the rollers 110 and 112 against the sides and bilges of the hull at the bow, serves to guide the boat toward the keel roller 70 and guide the keel into the roller and prevent sluing of the boat by action of the wind or the waves against the stern remaining in the water. In such manner the boat is held against the wind and the waves in perfect alignment with the trailer as the boat is either being launched or loaded. Those familiar with small boat handling at the water's edge will appreciate the fact that a boat tends to slue around when held only by a bow line and that with the provision of means for keeping the boat properly aligned with the trailer for loading and launching, a very troublesome situation is remedied.

Cooperating with the rollers 110 and 112 in facilitating loading and launching of a boat, I have provided what may be termed a control line or table. This line, indicated at 130 in Figs. 1 and 5, is fastened at one end to the tongue as at 132 by means of a bolt or the like 134 (see Fig. 8) extending through the tongue and about which the line is wrapped and secured. The opposite end of the line is connected in any convenient fashion to the bumper A of the automotive vehicle, and may be connected to the bumper at the ball member 54–a. The point at which the line is connected to the tongue lies closer to the wheels of the trailer than to the trailer hitch 54 at the forward end of the tongue. The length of the line is such that with the line taut, the hitch 54 will drop over the ball member 54–a on the bumper. With the hitch disconnected from the ball member the trailer may be manually swung around to extend perpendicular to the water's edge even though the automotive vehicle is parallel to the water's edge. However, the control cable, in addition, permits the trailer to be tilted up at its forward end and down at the rear to facilitate launching and loading of a boat, and this without any appreciable effort on the part of the boatman.

Assuming that the automotive vehicle is driven close to the water's edge and that the rear end of the trailer overhangs the water, to unload the boat line 68 is unwound from the winch sufficiently to permit the boatman to roll the boat rearwardly on the trailer to a point such that the boat is balanced over the wheels of the trailer. The hitch 54 is loosened to permit it to uncouple from the ball member 54–a, and the boat is then rolled further rearwardly thereby displacing the center of gravity of the boat and trailer to a point rearwardly of the wheels 12 and 14. Thereupon the trailer will automatically tilt such that the end of arms 102 and 104 enter the water and rest on the bottom as shown in Fig. 5. By further unwinding of the winch the boat will slide off the trailer into the water. To load the boat onto the trailer the operation is the reverse of that described. The trailer is tilted to rest the ends of the arms on the bottom. The bow of the boat is drawn between the guiding and supporting rollers 110 and 112 and the line 68 connected to the boat, and the winch cranked to draw the boat up over the rollers and into engagement with the rearmost keel roller 70, and thence into position against the bilge blocks and forward roller 69. Because the arms 102 and 104 are bent as at 108, the rear ends of the arms are below the plane of the frame of the trailer. The ends of the arms may therefore rest upon the bottom of the body of water into which the boat is being launched while the guide rollers 110 and 112 are well up from the bottom ready to guide the boat onto or off the trailer.

The control cable prevents the trailer from moving farther out into the water and permits the trailer to tilt while still retaining control of its movement. The cable also steadies the trailer and prevents it from sluing around when the wind and water are acting against the boat. The chocking rollers 110 and 112 holds the boat in alignment with the keel rollers 69 and 70 when the line 68 is drawn taut even though the boat may be almost completely water-borne.

What I claim is:

1. A boat trailer for coupling to an automotive vehicle and for loading and launching a boat at the water's edge comprising: a frame; a pair of wheels supporting the frame, one wheel at each side thereof; a trailer hitch at the forward end of the frame for coupling the frame to an automotive vehicle; means mounted atop the frame to support a boat disposed on the frame; said means including keel guide roller means disposed at the longitudinal center line of the frame to guide the keel of a boat moving longitudinally of the frame; arm means secured to the frame and extending rearwardly therefrom; guiding and supporting roller means mounted on said arm means spaced rearwardly from the frame and disposed on opposite sides of the longitudinal center line of the frame to hold the bow of a boat in alignment with said keel guide roller means when loading or launching the boat and underlying the stern of the boat when the boat is disposed in a fully loaded position on the frame;

a control line connected at one end to the frame at a point lying more closely adjacent the wheels thereof than the trailer hitch and adapted to be coupled at the opposite end to an automotive vehicle; said line being operable, when the trailer hitch is disconnected from an automotive vehicle and the line is coupled to the vehicle, to permit tiltable movement of the frame about the axis of the wheels of the frame lowering said guiding and supporting roller means toward the water's edge to provide guided movement of a boat, through cooperation of both said roller means and control line, either onto or off the frame.

2. A boat trailer comprising: a frame, a pair of wheels supporting the frame for movement, boat supporting and positioning means mounted on the frame, a pair of arms extending rearwardly of the frame and having their rear ends disposed below the plane of the frame, a pair of soft rollers mounted for rotation adjacent the rearward end of said arms and each roller disposed with its axis of rotation extending substantially normal to the longitudinal center line of the frame with the rollers spaced from each other on opposite sides of the longitudinal center line of the frame to cooperably guide and support the bow of a boat during loading of the boat on the frame, said rollers disposed in generally planar alignment with the said boat supporting and positioning means to support the stem of a boat resting on the said boat supporting and positioning means, means at the forward end of the frame for coupling the same to an automotive vehicle, and a loading and launching device mounted on the forward end of the frame and attachable to a boat and operable to ease the boat rearwardly off the frame or draw the bow of the boat between said rollers and over said supporting and positioning means onto the frame.

3. A boat trailer comprising: a frame, a pair of road wheels supporting the frame for movement behind an automotive vehicle, a trailer hitch at the forward end of the frame to connect the same to an automotive vehicle, keel-supporting rollers mounted on the center line of the frame, generally elongate soft covered bilge blocks at opposite sides of the frame and extending longitudinally thereof to support a boat resting upon the keel rollers, said bilge blocks being pivotable about axes extending laterally of the frame, winch means at the forward end of the frame for easing a boat onto or off of the frame, a trailer hitch at the forward end of the frame for coupling the same to an automotive vehicle, arm means connected to the frame and extending rearwardly thereof, a pair of guide rollers mounted on the outer end of said arm means in spaced relation and with the axes of rotation of the rollers extending substantially normal to the longitudinal center line of the frame, and each roller supported for freely pivotable movement about an axis extending substantially parallel to the longitudinal center line of the frame.

4. A boat trailer comprising: a frame, a pair of road wheels supporting the frame for movement behind an automotive vehicle, a trailer hitch at the forward end of the frame to connect the same to an automotive vehicle, keel supporting rollers mounted for rotation on the center line of the frame, bilge blocks at opposite sides of the frame to support a boat resting upon the keel rollers, winch means at the forward end of the frame for easing a boat onto or off of the frame, a trailer hitch at the forward end of the frame for coupling the same to an automotive vehicle, a pair of rearwardly extending arm members disposed in laterally spaced relation on opposite sides of the longitudinal center line of the frame and connected to the frame, a pair of guide rollers mounted on the outer end of each arm in laterally spaced-apart relation and with the axis of rotation of the rollers extending transversely of the center line of the frame, and each roller supported for freely pivotable movement about an axis extending substantially parallel to the longitudinal center line of the frame.

5. A boat trailer for coupling to an automotive vehicle and for loading and launching a boat at the water's edge comprising: a frame; a pair of wheels supporting the frame, one wheel at each side thereof; a trailer hitch at the forward end of the frame for coupling the frame to an automotive vehicle; a plurality of keel supporting rollers mounted on the frame along the longitudinal center line thereof to guide the keel of a boat moving longitudinally of the frame; means coupled to the frame at the rear end thereof and supporting a pair of guide rollers spaced rearwardly from said wheels and disposed in spaced relation on opposite sides of the longitudinal center line of the frame and underlying the stern of the boat when the boat is disposed in a fully loaded position on the frame; a control line; means connecting the control line at one end to the frame at a point lying more closely adjacent the wheels than the trailer hitch and adapted to extend freely forwardly along the frame therebelow for coupling to an automotive vehicle at the other end; said line being operable, when the trailer hitch is disconnected from an automotive vehicle and the line is coupled to the vehicle, to permit swingable movement of the forward end of the frame laterally of the control line and swingable movement of the forward end of the frame vertically upwardly relative to the control line to tilt the frame about the axis of the wheels lowering said guide rollers toward the water's edge.

References Cited in the file of this patent

UNITED STATES PATENTS

| 2,442,248 | Sampsell | May 25, 1948 |
| 2,636,745 | Cartwright | Apr. 28, 1953 |
| 2,676,716 | Sallis | Apr. 27, 1954 |
| 2,708,045 | Shontz | May 10, 1955 |
| 2,711,259 | Jones | June 21, 1955 |
| 2,723,038 | Peterson et al. | Nov. 8, 1955 |

UNITED STATES PATENT OFFICE

CERTIFICATE OF CORRECTION

Patent No. 2,788,146                           April 9, 1957

Ernst H. Gronlund

It is hereby certified that error appears in the above numbered patent requiring correction and that the said Letters Patent should read as corrected below.

In the drawing, Sheet 1, Figure 1, the upstanding bracket which is shown as being bolted to the tongue 60 should have reference numeral 58 applied to it; in the printed specification, column 2, line 34, for "car 64" read —arm 64—; column 3, line 71, for "boat. I" read —boat, I—; line 72, for "table" read —cable—.

Signed and sealed this 6th day of August 1957.

(SEAL)
Attest:

KARL H. AXLINE
Attesting Officer

ROBERT C. WATSON
Commissioner of Patents